United States Patent
Mizukami

(10) Patent No.: US 8,553,377 B2
(45) Date of Patent: Oct. 8, 2013

(54) ELECTRONIC CONTROL DEVICE

(75) Inventor: Hiroshi Mizukami, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/206,993

(22) Filed: Aug. 10, 2011

(65) Prior Publication Data

US 2012/0257309 A1 Oct. 11, 2012

(30) Foreign Application Priority Data

Apr. 8, 2011 (JP) .................................. 2011-086254

(51) Int. Cl.
 *H02H 7/00* (2006.01)
 *H02H 9/00* (2006.01)
 *H03K 3/00* (2006.01)

(52) U.S. Cl.
 USPC ............................................ 361/18; 327/109

(58) Field of Classification Search
 USPC .......................................................... 361/18
 See application file for complete search history.

(56) References Cited

U.S. PATENT DOCUMENTS

| | | | |
|---|---|---|---|
| 5,138,515 A * | 8/1992 | Bourgeois | 361/18 |
| 6,169,431 B1 * | 1/2001 | Xu | 327/109 |
| 7,787,225 B2 | 8/2010 | Nishimura | |
| 2008/0099838 A1 | 5/2008 | Nishimura | |
| 2008/0247108 A1 * | 10/2008 | Ando et al. | 361/84 |
| 2010/0046124 A1 * | 2/2010 | Hibi | 361/18 |

FOREIGN PATENT DOCUMENTS

| | | |
|---|---|---|
| JP | 3-106114 A | 5/1991 |
| JP | 09-284109 A | 10/1997 |
| JP | 2008-112828 A | 5/2008 |

OTHER PUBLICATIONS

Japanese Office Action dated Oct. 2, 2012 issued in counterpart Japanese Patent Application No. JP 2011-086254.

* cited by examiner

*Primary Examiner* — Jared Fureman
*Assistant Examiner* — Lucy Thomas
(74) *Attorney, Agent, or Firm* — Sughrue Mion, PLLC

(57) ABSTRACT

A control circuit is provided including a trigger circuit having a capacitor connected between a pulse generator and a second switching element, and a latch circuit connected via a diode, between a junction of a load with a first switching element and the control terminal of the second switching element, wherein when the pulse generator outputs a drive signal, both of the first switching element and the second switching element are turned on and the second switching element is held in the ON state through the latch circuit by a voltage at the junction. When the drive signal is stopped, both of the first switching element and the second switching element are turned off; meanwhile if the load is short-circuited, the first switching element and the second switching element are turned off through the latch circuit by the voltage at the junction.

10 Claims, 2 Drawing Sheets

ELECTRONIC CONTROL DEVICE

BACKGROUND OF THE INVENTION

1. Field of the Invention

The present invention relates to an electronic control device for controlling vehicular equipment, mounted on an automobile, for example.

2. Description of the Related Art

Until now, an electronic control device has been disclosed that includes a current detection resister and a short-circuit protection circuit for detecting a short (short circuit) of a load based on a voltage generated by a current flowing through the current detection resister, so as to protect a load drive unit against an overcurrent, wherein when a current flowing through a drive circuit including the load and a switching element is detected exceeding a predetermined value, the current flowing through the circuit is limited or shut off. (For example, refer to Patent Document 1.)

Patent Document 1: Japanese Laid-open Patent No. H3-106114

The conventional device disclosed in Patent Document 1, in order to limit or shut off the current flowing through the load drive unit when the current is detected exceeding a predetermined value, incorporates the current detection resister and the short-circuit protection circuit that detects the load short-circuiting, based on the voltage generated by the current flowing through the current detection resister, so as to protect the load drive unit against an overcurrent. However, the current detection resister needs to be connected in series with the load drive unit, and the resister not only wastes energy but also generates heat in itself, thereby leading to heating up the electronic control device as a whole. Moreover, in order to detect a large current, a resister having an appropriate power rating needs to be chosen, which in turn leads to an increase in the element size. Furthermore, when a short circuit is detected, the load drive unit needs to be held in a shut-off state; therefore, there has been a problem in that an extra latch circuit and the like need to be provided, leading to an increase in the circuit size.

SUMMARY OF THE INVENTION

The present invention has been made to resolve the foregoing problems with the conventional device, and aims at providing an electronic control device that enables protection against a short circuit with a simple circuit at low cost without using any current detection resister.

An electronic control device according to the present invention comprises: a first switching element for driving a load, connected in series with the load between a power source and ground; a second switching element for taking ON/OFF control of the first switching element, connected to the control terminal of the first switching element; a pulse generator for controlling the second switching element; and a control circuit including a trigger circuit having a capacitor connected between the pulse generator and the second switching element, and a latch circuit connected via a diode, between a first junction that is a connecting point of the load with the first switching element and the control terminal of the second switching element; wherein when the pulse generator outputs a drive signal, the control circuit turns on through the trigger circuit the second switching element for a predetermined time, thereby also turning on the first switching element so as to drive the load, and in addition, holds the second switching element in the ON state through the latch circuit by a voltage generated at the first junction, whereas when the pulse generator stops outputting the drive signal, the control circuit turns off both of the first switching element and the second switching element; meanwhile if the load is short-circuited, the control circuit turns off the second switching element through the latch circuit by the voltage generated at the first junction even when the pulse generator is outputting the drive signal, thereby also turning off the first switching element.

According to the present invention, an effect of obtaining an electronic control device can be brought about in which the current detection resister is not needed, its protection circuit is simplified, and as a result, protection against a short circuit is enabled at low cost.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
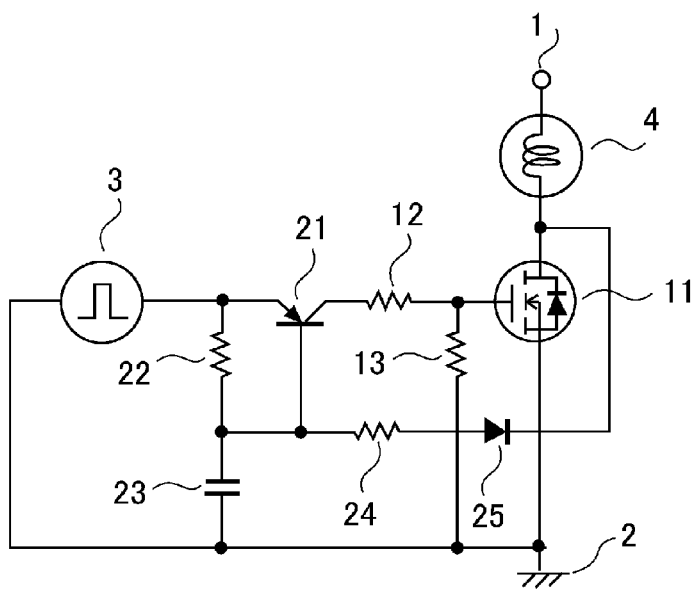
FIG. 1 is a circuit configuration diagram for an electronic control device according to Embodiment 1 of the present invention.

FIG. 1 is a circuit diagram for an electronic control device according to Embodiment 1 of the present invention. In FIG. 1, a load 4 and a load drive transistor 11, which is a first switching element, are connected in series with each other between a power source terminal 1 and ground 2; the load is energized or shut off with the load drive transistor 11 switched over between ON and OFF. The collector or drain of the load drive transistor 11 is connected to the load 4, and the emitter or source thereof to ground 2.

Firstly in the normal circuit operation, when a voltage from a pulse generator 3 changes from LOW to HIGH, a base current is supplied to a transistor 21, which is a second switching element, for a predetermined time through a resister 22 and a capacitor 23 for triggering. The transistor 21 is turned on, and the load drive transistor is thereby supplied with a base current or a drain voltage so as to be turned on.

When the load drive transistor 11 is turned on, a current flows through the load 4, so that the load 4 begins its operation. At this moment, the voltage at the collector or drain of the load drive transistor 11 becomes almost the same as that at ground 2 due to a voltage drop by the resistance of the load 4. Before the trigger capacitor 23 is fully charged up and the base current to the transistor is thereby stopped, the voltage at the collector or drain of the load drive transistor 11 becomes almost the same as that at ground 2, whereby the base current to the transistor 21 continues to flow through a resister 24 and a diode 25, which constitute a latch circuit, and as a result, the transistor 21 and the load drive transistor 11 each continue to be on and the current supplied to the load 4 is continuously held.

Next, when the voltage from the pulse generator 3 changes from HIGH to LOW, the transistor 21 is turned off with its base current shut off. Therefore, the load drive transistor 11 is also turned off, and the load 4 is no longer supplied with the current, so that the load 4 stops the operation.

At this moment, the voltage at the collector or drain of the load drive transistor 11 becomes the same as that at the power source terminal 1; however a current does not flow into the capacitor through the diode 25, and the voltage across the capacitor 23 is held at the LOW voltage of the pulse generator 3. The diode 25 serves not only for the external load not to affect charging and discharging of the trigger capacitor 23 but also for a dark current not to flow into the circuit when the electronic control device is not in operation.

Next, if both ends of the load 4 are short-circuited with each other due to any abnormality while the load is in operation, the voltage at the collector or drain of the load drive transistor 11 becomes the same as that at the power source terminal 1; therefore, the voltage at the cathode of the diode 25 is made higher than that at the anode thereof, whereby the base current to the transistor flowing through the latch circuit made up of the resister 24 and the diode 25 is shut off, so that the transistor 21 is held in the OFF state.

Next, the operation of the above-configured electronic control device according to Embodiment 1 of the present invention will be explained in more detail.

Figure 2:
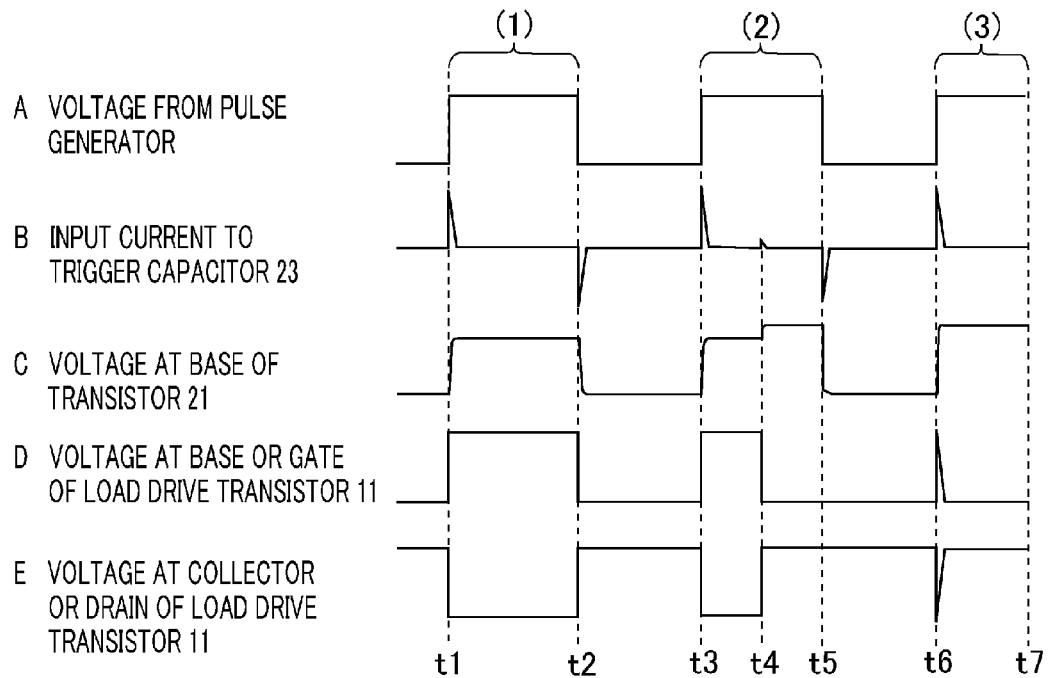
FIG. 2 is a timing chart for explaining the operation of the electronic control device according to Embodiment 1 of the invention.

FIG. 2 is a timing chart for explaining the operation of the electronic control device according to Embodiment 1 of the invention. "A" in FIG. 2 shows a voltage waveform from the pulse generator; a waveform of an input current to the trigger capacitor 23; "C", a voltage waveform at the base of the transistor 21; "D", a voltage waveform at the base or gate of the load drive transistor 11; and "E", a voltage waveform at the collector or drain of the load drive transistor 11.

In FIG. 2, since the trigger capacitor 23 is charged up at time t1 by the HIGH voltage output from the pulse generator 3, a current flows through the emitter and base of the transistor 21 for a predetermine time. The transistor 21 is turned on by the current flowing through the emitter and base thereof, which supplies the transistor 11 with a base current or a gate voltage, so that the transistor 11 is turned on and a current begins flowing through the load 4 accordingly.

During the period (1) between time t1 and time t2, before the trigger capacitor 23 is fully charged up after time t1 and the current flowing therethrough is thereby stopped, the load drive transistor 11 is turned on, whereby the base current from the transistor 21 flows, through the resister 24, the diode 25, and the collector and emitter of the load drive transistor 11, to ground 2, so that the transistor 21 is held in the ON state. The load drive transistor 11 is also held in the ON state, and the current supplied to the load 4 is thereby continuously held. At this moment, the base voltage at the transistor 21 becomes a voltage lower than the HIGH voltage of the pulse generator 3 by a voltage between the base and emitter of the transistor 21, VBE.

At time t2 when the period (1) ends, the voltage output from the pulse generator 3 changes from HIGH to LOW, and the base voltage at the transistor 21 also changes from HIGH to LOW, thereby turning off the transistor. At this moment, the electric charge stored in the trigger capacitor is discharged to the pulse generator 3 through the resister 22; therefore a negative input current flows for a predetermined time.

In addition, when the transistor 21 is turned off, the base current or the gate voltage to the load drive transistor 11 is shut off, thereby turning off the transistor, and the current to the load 4 is consequently shut off.

Next, at time t3, since the trigger capacitor 23 is charged up by the HIGH voltage output again from the pulse generator 3, a current flows through the emitter and base of the transistor 21 for a predetermine time. The transistor 21 is turned on by the current flowing through the emitter and base thereof, which supplies the load drive transistor 11 with the base current or the gate voltage, so that the transistor 11 is turned on and a current begins flowing through the load 4 accordingly.

After time t3, before the trigger capacitor 23 is fully charged up and the current through the capacitor is thereby stopped, the load drive transistor 11 is turned on, whereby the base current from the transistor 21 flows, through the resister 24, the diode 25, and the collector and emitter of the load drive transistor 11, to ground 2, so that the transistor 21 is held in the ON state. The load drive transistor 11 is also held in the ON state, and the current flowing through the load 4 is continuously held. At this moment, the base voltage at the transistor 21 becomes the voltage lower than the HIGH voltage of the pulse generator by the voltage between the base and emitter of the transistor 21, VBE.

Now, if both ends of the load 4 are short-circuited with each other due to any abnormality at time t4, for example, the collector or drain voltage of the transistor 11 becomes the same as the voltage at the power source terminal 1; therefore, the voltage at the cathode of the diode 25 becomes higher than that at the anode thereof. At this moment, the base voltage of the transistor 21 rises up to the HIGH voltage of the pulse generator 3 from the voltage lower than the HIGH voltage of the pulse generator by the voltage between the base and emitter of the transistor 21, VBE, so that the transistor 21 is turned off. Moreover, the trigger capacitor 23 is charged up in the meantime; therefore a current flows through the emitter and base of the transistor 21 for a predetermined time.

When transistor 21 is turned off, the base or gate voltage of the load drive transistor 11 is changed from HIGH to LOW. The load drive transistor 11 is thereby turned off, and a short-circuit current through the load 4 is shut off.

This short-circuit state of both ends of the load 4 is assumed to continue after time t4 due to any abnormality.

Next, at time t5 when the period (2) ends, the voltage output from the pulse generator 3 changes from HIGH to LOW and the voltage at the transistor 21 base also changes from HIGH to LOW accordingly; however the transistor 21 is in the OFF state after the load 4 has been detected short-circuiting; therefore the transistor 21 is held in the OFF state.

At this moment, the electric charge stored in the trigger capacitor 23 is discharged to the pulse generator 3 through the resister 22; therefore a negative input current flows for a predetermined time. Moreover, since the transistor 21 is held in the OFF state, the base current or the gate voltage of the load drive transistor 11 is held shut off, and the load drive transistor 11 is thereby held in the OFF state, so that the current through the load 4 is held shut off.

Next, during the period (3) between time t6 and time t7, the trigger capacitor 23 is again charged up at time t6 by the HIGH voltage output from the pulse generator 3, a current flows through the emitter and base of the transistor 21 for a predetermined time. During this time, the transistor 21 is turned on, thereby turning on the load drive transistor 11; however except for that time, the load drive transistor 11 is turned off. By setting short enough the predetermined time in which the load drive transistor 11 is turned on, the transistor 11 is protected against the short-circuiting of both ends of the load 4.

As described above, the electronic control device according to Embodiment 1 of the present invention does not detect a short circuit by a voltage generated across the current detection resister but is characterized in that protection against the short circuit can be ensured by allowing and/or forbidding the base or gate of the load drive transistor to be conductive by a voltage between the collector and emitter or between the drain and source of the load drive transistor, which is the first switching element for driving the load.

Moreover, the device is characterized in that a transistor that is the second switching element for allowing and/or forbidding the first switching element to be conductive is incorporated in the trigger circuit that supplies a current for a predetermined time synchronized with the pulse generator, and functions of both outputting the trigger for driving the load and forbidding the first switching element to be conductive if the load is detected short-circuiting are included in a single circuit.

Therefore according to Embodiment 1 of the present invention, an electronic control device can be obtained in which any current detection resister is not needed, the protection circuit is simplified, and as a result, protection against a short circuit is enabled at low cost.

Embodiment 2

Figure 3:
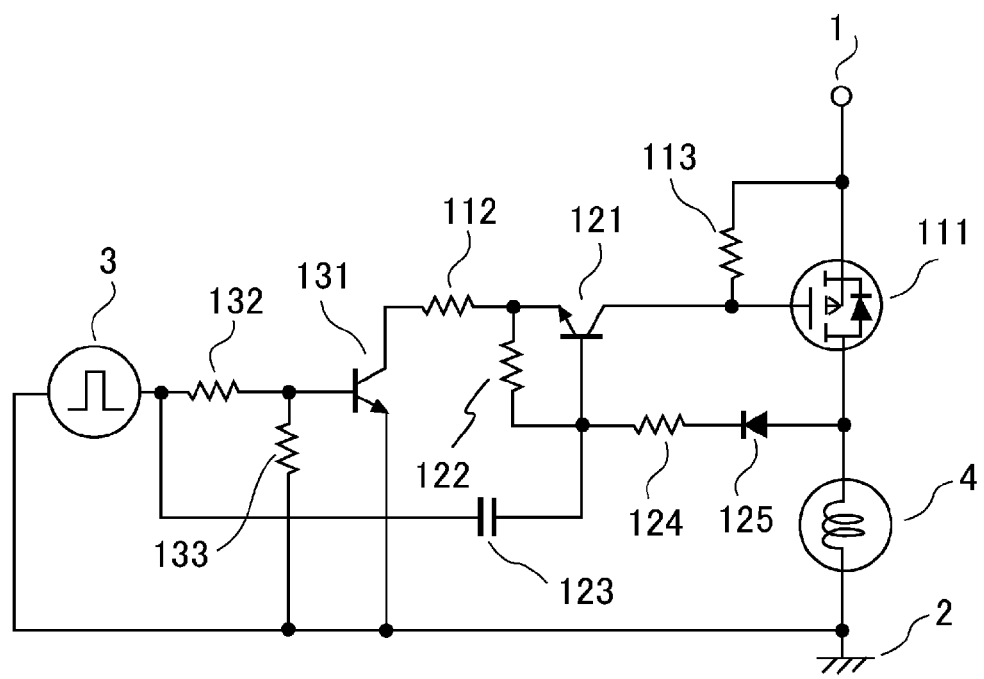
FIG. 3 is a circuit configuration diagram for an electronic control device according to Embodiment 2 of the invention.

FIG. 3 is a circuit diagram for an electronic control device according to Embodiment 2 of the present invention. In this Embodiment 2, a load drive transistor 111 and a transistor 121 correspond to the first switching element and the second switching element, respectively. That is to say, in FIG. 3, the load 4 and the first transistor 111 that is the switching transistor for driving the load are connected in series with each other between the power source terminal 1 and ground 2. The load 4 is energized or shut off with the load transistor 111 switched over between ON and OFF. The collector or drain of the load drive transistor 111 is connected to the load 4, and the emitter or source thereof to the power source terminal 1.

Firstly, when the voltage from the pulse generator 3 changes from LOW to HIGH in the normal operation, a transistor 131 is supplied with a base current through a resister 132, so as to be turned on. When the transistor 131 is turned on, a base current is supplied for a predetermined time to the transistor 121 through a capacitor 123, a resister 122, a resister 112, and the collector and emitter of the transistor 131. Therefore, the transistor 121 is turned on, and the load drive transistor 111 is thereby supplied with a base current or a drain voltage so as to be turned on. When the load drive transistor 111 is turned on, a current flows through the load 4, so that the load 4 begins its operation. At this moment, the voltage at the collector or drain of the load drive transistor 111 becomes almost the same as that at the power source terminal 1 due to the voltage drop by the resistance of the load 4.

Before the trigger capacitor 123 is fully charged up and the base current to the transistor 121 is thereby stopped, the voltage at the collector or drain of the load drive transistor 111 becomes almost the same as that at the power source terminal 1, whereby the base current to the transistor 121 continues to flow through a resister 124 and a diode 125, both transistor 121 and load drive transistor 111 continue to be on, and as a result, the current supplied to the load 4 is continuously held.

Next, when the voltage from the pulse generator 3 changes from HIGH to LOW, the base current to the transistor 131 is shut off and the transistor 131 is turned off accordingly, whereby the base current to the transistor 121 is also shut off and the transistor 121 is turned off. Therefore, the load drive transistor 111 is also turned off and the load 4 is no longer supplied with the current, so that the load 4 stops the operation. At this moment, the voltage at the collector or drain of the load drive transistor 111 becomes the same as that at ground 2; a current does not flow through the diode 125, and as a result, the voltage across the capacitor 123 is held at the LOW voltage of the pulse generator 3. The diode 125 serves for the external load not to affect charging and discharging of the trigger capacitor 123.

Next, if both ends of the load are short-circuited with each other due to any abnormality while the load 4 is in operation, the voltage at the collector or drain of the load drive transistor 111 becomes the same as that at ground 2; therefore, the voltage at the anode of the diode 125 becomes lower than that at the cathode thereof, whereby the base current flowing to the transistor 121 through the diode 125 and the resister 124 is shut off, and as a result, the transistor 121 is held in the OFF state.

As described above, the electronic control device according to Embodiment 2 of the present invention is characterized the same as that of Embodiment 1 as follows:

(1) The logical value (HIGH or LOW potential) at the collector or drain of the load drive transistor is reversed if a short (short circuit) of the load is detected, and by making use of this, the control circuit that turns on and off the load drive transistor, which is the first switching element connected between the load and the power source terminal, continuously holds in the OFF state the transistor, which is the second switching element provided on the base side of the load drive transistor, for allowing and/or forbidding the load drive transistor to be conductive, and thereby also holds the load drive transistor continuously in the OFF state, so as to enable protection against the short circuit to be ensured.

(2) Moreover, when turning on the load drive transistor, which is the first switching element for driving the load, the control circuit for turning on and off the transistor temporarily turns on the transistor by the trigger circuit that supplies a current for a predetermined time synchronized with the pulse generator. Once the load drive transistor is turned on, the logical value (HIGH or LOW potential) at the collector or drain of the load drive transistor is reversed, and by making use of this, the control circuit can hold the load drive transistor in the ON state.

(3) Moreover, the control circuit incorporates a transistor that is the second switching element for allowing and/or forbidding the load drive transistor to be conductive, as part of the trigger circuit that supplies the current to the load drive transistor, when it is turned on, for the predetermined time synchronized with the pulse generator, whereby the protection circuit can be simplified.

In the foregoing Embodiments 1 and 2, the explanation has been made on a case in which both ends of the load are short-circuited with each other; however, this invention is not limited to this, but can be applied to other cases in which a predetermined voltage is generated at the collector of the load drive transistor, and similar effects can be brought about in protecting the load drive transistor.

Various modifications and alterations of this invention will be apparent to those skilled in the art without departing from the scope and spirit of this invention, and it should be understood that this is not limited to the illustrative embodiments set forth herein.

What is claimed is:

1. An electronic control device, comprising:
   a first switching element for driving a load, connected in series with the load between a power source and ground;
   a second switching element for taking ON/OFF control of the first switching element, connected to the control terminal of the first switching element;
   a pulse generator for controlling the second switching element; and
   a control circuit including a trigger circuit having a capacitor connected between the pulse generator and the control terminal of the second switching element and a first resistor connected in series to the capacitor, and a latch circuit comprising a second resistor and a diode connected in series, wherein the latch circuit is connected via the diode, between a first junction that is a connecting point of the load with the first switching element and the control terminal of the second switching element; wherein when the pulse generator outputs a drive signal, the control circuit turns on through the trigger circuit the second switching element for a predetermined time, thereby also turning on the first switching element so as to drive the load, and in addition, holds the second switching element in an ON state through the latch circuit by a voltage generated at the first junction, whereas when the pulse generator stops outputting the drive signal, the control circuit turns off both of the first switching element and the second switching element; meanwhile if the load is short-circuited, the control circuit turns off the second switching element through the latch circuit by the voltage generated at the first junction even when the pulse generator is outputting the drive signal, thereby also turning off the first switching element.

2. An electronic control device according to claim 1, wherein the load is connected to the power supply side and the first switching element is connected downstream of the load.

3. An electronic control device according to claim 2, wherein the second switching element is turned on for a predetermined time by making use of an integrating function of the capacitor used in the trigger circuit, and the first switching element is thereby also turned on so as to drive the load.

4. An electronic control device according to claim 2, wherein the cathode of the diode included in the latch circuit is connected to the first junction between the load and the first switching element, and the capacitor included in the trigger circuit is thereby charged up without being affected by the power supply connected to the load, and in addition, a dark current is prevented from flowing into the control circuit when the electronic control device is not in operation.

5. An electronic control device according to claim 1, wherein the load is connected to the ground side and the first switching element is connected upstream of the load.

6. An electronic control device according to claim 5, wherein the second switching element is turned on for a predetermined time by making use of a differential function of the capacitor used in the trigger circuit, and the first switching element is thereby also turned on so as to drive the load.

7. An electronic control device according to claim 5, wherein the anode of the diode included in the latch circuit is connected to the first junction between the load and the first switching element, and the capacitor included in the trigger circuit is thereby charged up without being affected by the ground connected with the load.

8. The electronic control device according to claim 1, wherein the electronic control device excludes a current detection resistor.

9. The electronic control device according to claim 1, wherein the second switching element is incorporated into the trigger circuit which is a single circuit.

10. An electronic control device, comprising:
a first switching element for driving a load, connected in series with the load between a power source and ground;
a second switching element to be turned on/off for taking ON/OFF control of the first switching element, connected to the control terminal of the first switching element;
a pulse generator for supplying a drive signal to the second switching element to take ON/OFF control thereof; and
a control circuit including a trigger circuit which comprises a series connection of a first resistor and a capacitor and is connected between output terminals of the pulse generator, in which a connecting point of the first resistor with the capacitor is connected to the control terminal of the second switching element, and a latch circuit which comprises a series connection of a diode and a second resistor and is connected between a first junction that is a connecting point of the load with the first switching element and a connecting point of the capacitor to the control terminal of the second switching element, in which the diode is connected in forward direction with respect to the first switching element;
wherein, when the pulse generator outputs a drive signal, the control circuit turns on through the trigger circuit the second switching element for a predetermined time, thereby also turning on the first switching element so as to drive the load, and in addition, holds the second switching element in an ON state by supplying an operation current to the control terminal of the second switching element, through the diode of the latch circuit by a voltage generated at the first junction when the first switching elements is turned on, and
wherein, when the pulse generator stops outputting the drive signal, the control circuit turns off both of the first switching element and the second switching element; meanwhile if the load is short-circuited when the pulse generator is outputting the drive signal, the control circuit turns off the second switching element by shutting off supplying the operation current to the control terminal of the second switching element, through the diode of the latch circuit by the voltage generated at the first junction, thereby also turning off the first switching element.

* * * * *